A. L. W. PLUGGE.
SIGNAL DEVICE.
APPLICATION FILED SEPT. 23, 1915.
1,204,311.
Patented Nov. 7, 1916.
3 SHEETS—SHEET 3.
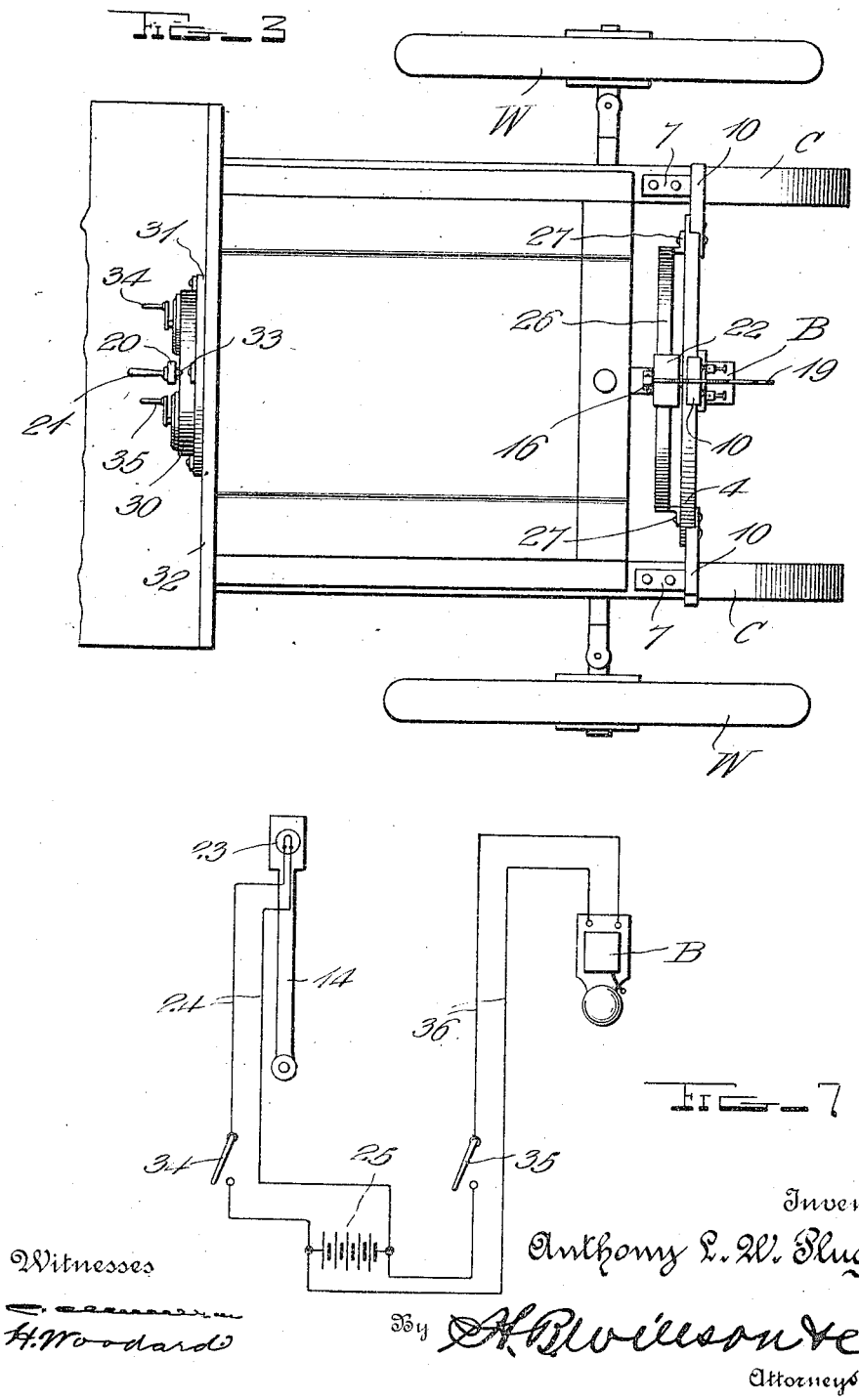
Witnesses
H. Woodard
Inventor
Anthony L. W. Plugge
By H. B. Willson & Co.
Attorneys

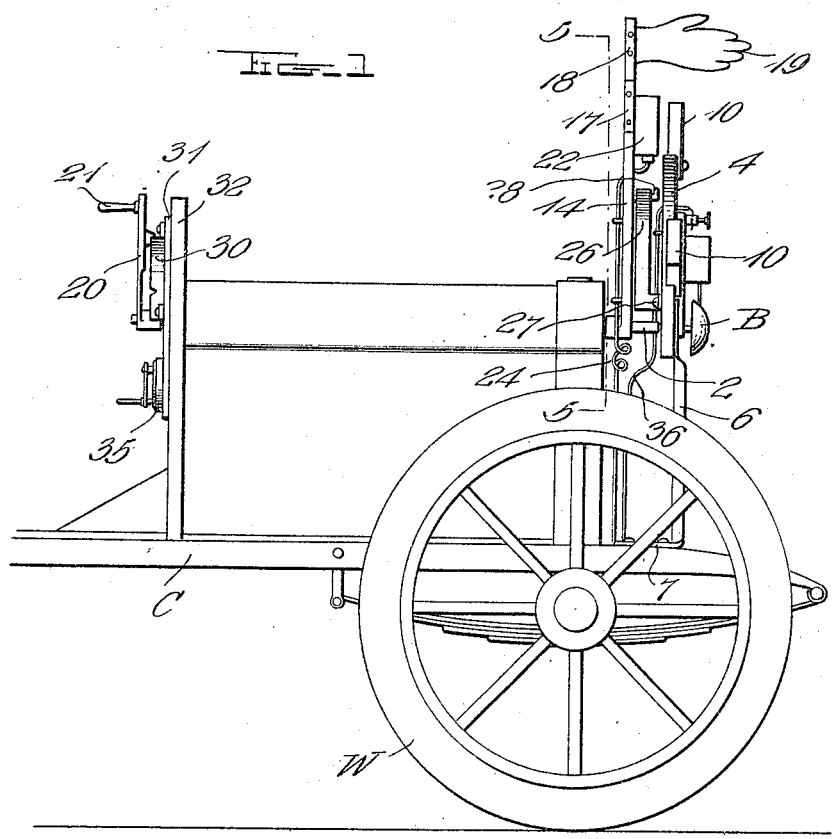
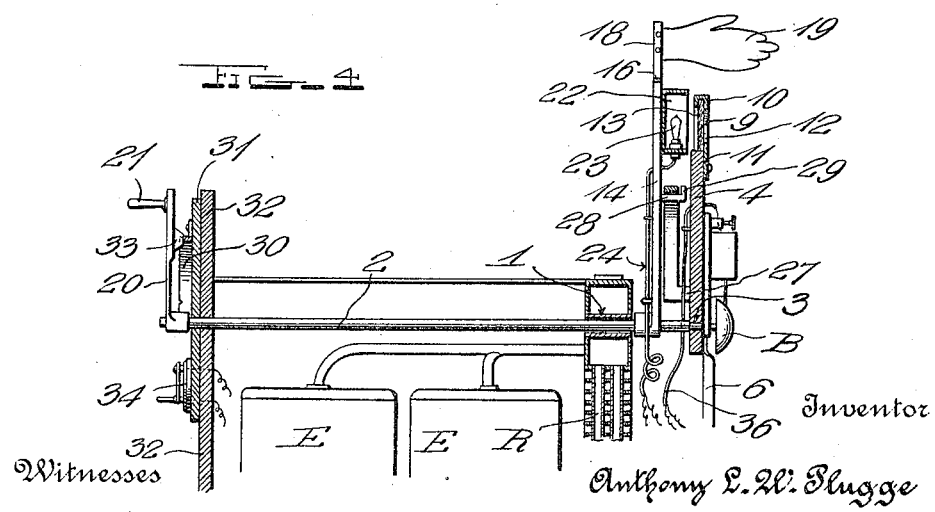

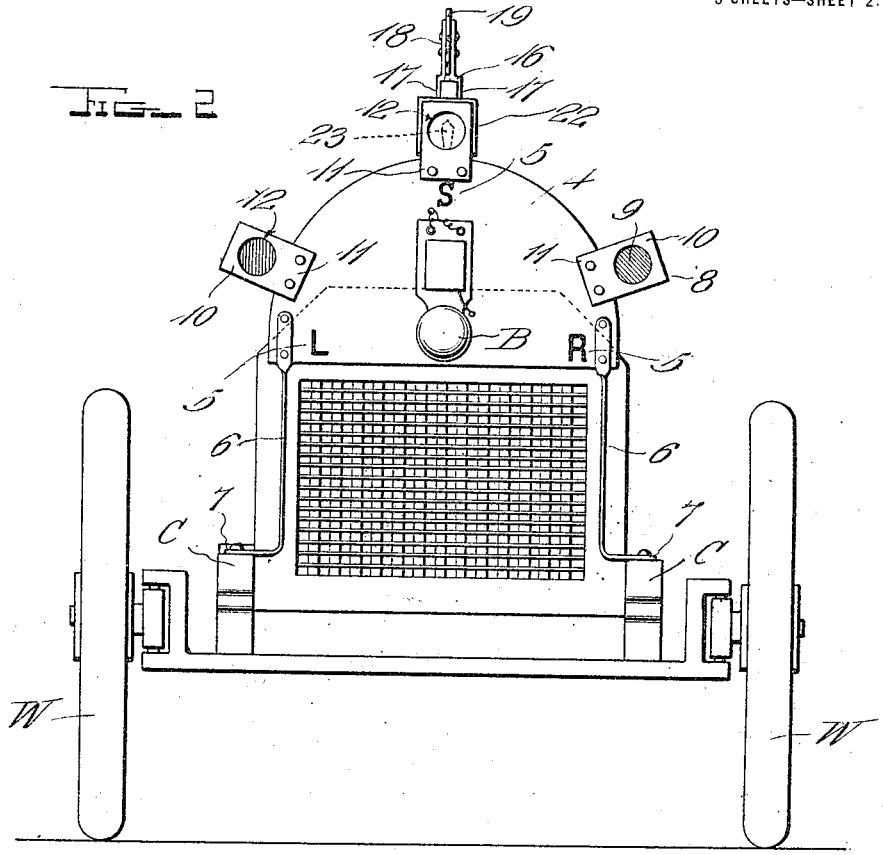

UNITED STATES PATENT OFFICE.

ANTHONY L. W. PLUGGE, OF GRAND RAPIDS, MICHIGAN.

SIGNAL DEVICE.

1,204,311. Specification of Letters Patent. Patented Nov. 7, 1916.

Application filed September 23, 1915. Serial No. 52,239.

*To all whom it may concern:*

Be it known that I, ANTHONY L. W. PLUGGE, a citizen of the United States, residing at Grand Rapids, in the county of Kent and State of Michigan, have invented certain new and useful Improvements in Signal Devices; and I do declare the following to be a full, clear, and exact description of the invention, such as will enable others skilled in the art to which it appertains to make and use the same.

This invention relates to improvements in signals of the type adapted to be mounted upon an automobile or other road vehicle for the purposes of indicating the direction in which the user of the signal intends to turn.

The object of the invention is to provide a simple yet reliable manually operable mechanism for controlling the movements of the direction indicator, particularly embodying in such mechanism simple and effective means for locking the indicator arm in operative position.

A further object is to provide means for illuminating the direction indicator at night.

With the above and numerous other objects in view, my invention relates to the novel features of construction which will hereinafter be more particularly described and claimed and shown in the drawings wherein:

Figure 1 represents a side elevation of the front end of an automobile showing my improved signaling device applied thereto;
Fig. 2 is a front elevation of the parts disclosed in Fig. 1; Fig. 3 is a top plan view of the same parts; Fig. 4 is a central vertical longitudinal section through my improved signaling device and the coöperating parts of the automobile; Fig. 5 is a transverse section taken on the line 5—5 of Fig. 1; Fig. 6 is an elevation of the switch board showing the means thereon for holding the operating crank in operative position; Fig. 7 is a diagrammatic view of the wiring used in connection with other parts of my device.

In the accompanying drawings similar reference characters indicate like parts throughout the several views.

My invention is shown applied to an automobile of the usual type which comprises a chassis C supported by the wheels W and having mounted on its front end an engine E, the water jackets of which are connected to the usual radiator R.

This invention is preferably mounted in the front of the vehicle although it is obvious that it could be mounted on the rear thereof with only a slight modification of the construction illustrated in the drawings. When the device is mounted on the front of the machine as illustrated, the radiator R is provided with a tube 1 through which a suitable operating shaft 2 extends, said tube 1 being suitably connected with the walls of the radiator in order that a water tight joint may be formed. The front end of the shaft 2 is rotatably mounted in a bearing 3 formed in the lower portion of a substantially semi-circular flat plate 4 upon which characters 5 are formed for indicating different directions. This plate 4 is mounted by any preferred means to the vehicle, the means shown in the drawings comprises substantially L-shaped brackets 6, the horizontal portions thereof being provided with attaching feet 7 adapted to be secured to the side bars of the chassis frame C. The particular method of mounting the plate is disclosed best in Figs. 1 and 2.

In addition to the characters 5, the plate 4 also carries the colored screens 8 which are here shown as formed of glass plates 9 mounted in suitable boxes 10. Each of the boxes 10 has one face extended as shown at 11 to provide an attaching portion by which the same may be secured to the plate; each front face is also provided with a circular opening 12 which is adapted to aline with an additional opening 13 on the rear face of the box. It is evident that the glass plates may be placed in these boxes before attaching them to the plate 4 and that when once attached, said plates will be reliably held in correct position therein.

The characters 5 are preferably three in number and designate the directions in which the user of the device may desire to go, the letter R being placed in the right hand corner, L in the left hand corner and S substantially in the center of the plate adjacent the upper edge thereof. It is obvious that R, when indicated by a suitable hand hereinafter to be described, shows that the vehicle is about to turn toward the right, when L is similarly indicated, the machine intends turning toward the left; and that when S is indicated, the machine will continue straight ahead in the direction in which it is moving.

I preferably place one of the screen boxes adjacent each of the letters and place a green colored glass in the box near the letter R, a red colored glass in the box near the letter L, and a plain colored glass above the letter S.

For indicating the direction of movement of the vehicle, a laterally swinging arm 14 is provided, the lower end of which is provided with an aperture adapted to receive the operating shaft 2 therethrough, said arm being keyed or otherwise fixed to said shaft so as to cause the arm to swing when the shaft is rotated. The free end of the arm 14 is provided with a bracket comprising a cross bar 16 having depending arms 17 extending at right angles therefrom and adapted to receive the end of the arm 14 therebetween, said end contacting with the cross bar and arms; similar arms 18 extend upwardly from the bar 16 and are adapted to receive a direction indicator preferably in the form of a hand 19. The free end of the shaft 2 is provided with a crank 20 which has an operating handle 21 thereon, said crank being keyed or otherwise fixed to the shaft 2 in order that when it is moved in one direction, the arm 14 may be likewise moved.

In addition to the hand 19, the arm 14 also carries an open faced light box 22 in which an incandescent lamp 23 is mounted, the electric wires 24 from said lamp being extended down the rear face of the arm 14 to a suitable source of current here shown in the form of a battery of cells 25.

From the foregoing description taken in connection with the Figs. 1, 2 and 3, it will be seen that when the driver of the vehicle moves the crank 20 toward the left, the arm 14 will move in the same direction, the hand 19 pointing to the letter R and notifying other persons that the vehicle intends turning toward the right. When turned in the opposite direction, it is obvious that the hand 19 will point to the letter L, thus indicating the intention of the driver to turn in that direction. When, however, the driver intends moving straight ahead, the arm 14 will be in upright position as shown in the figures, the hand pointing toward the letter S. At night it is necessary to light the lamp 23, the rays of which will pass through the glass plates 9 when the lamp box 22 is moved therebehind, thus also providing means for indicating the direction of turning when it is impossible to see the characters on front of the plate 4. At all times, however, it is expedient to ring the bell B placed on the front of the plate 4, thereby notifying pedestrians and others that the vehicle is about to turn, the direction of such turning being indicated by the hand or the light shining through one of the colored glasses.

A semi-circular guide in the form of an arcuate metal bar 26 is attached to the rear face of the plate 4 by the laterally extending feet 27, said feet spacing the guide away from the plate. This arcuate bar 26 is designed to prevent the arm 14 from wabbling, the latter being connected thereto by a finger 28 which has an outwardly bent end 29 disposed between the plate 4 and the edge of the guide. Since the center of the arc of the guide is the shaft upon which the arm 14 is fixed, the finger 28 will remain active throughout the length of movement of said arm, the movement being limited, however, by the engagement of the end 29 with the feet 27. Thus it will be seen that these feet 27 perform the dual function of attaching means for the guide and stops to limit the movement of the arm.

Additional and more positive means, however, are provided for securing the arm 14 in any one of its three positions. These means are in the form of a segment 30 secured to the switch board 31 which is mounted on the inner face of the dash board 32 of the vehicle. The segment 30 is notched at predetermined positions as shown, said notches being adapted to coact with a stop 33 formed on one side of the crank 20, said stop being adapted to spring in and out of the notches when the crank 20 is moved. Also mounted on the switch board 31 are the switches 34 and 35 used for controlling the current passing from the battery 25 to the light 23 and the bell B, the current to the bell B passing through the wires 36. The wiring used for connecting the light and the bell with the battery is fully illustrated in diagrammatic form in Fig. 7. At night, the switch 34 which controls the current and the light is allowed to stay on at all times, but the bell is only rung when the vehicle is about to make a turn.

From the foregoing description, it is obvious that I have provided a very simple signaling device which is very easily operated and which will be of great benefit to the many users of vehicles as well as other persons.

While I have described the elements best adapted to perform the functions set forth, it is obvious that various changes in form, proportion and in the minor details of construction, may be resorted to, within the scope of the appended claim, without departing from or sacrificing any of the principles of this invention.

I claim as my invention:

In a device of the class described, a plate to be secured on a vehicle, an operating shaft extending therefrom, an arcuate bar, laterally extending attaching feet formed on the opposite ends of said bar and secured to said plate, said bar being spaced from said plate, an arm fixed to said shaft, a finger carried by the arm for engagement with said bar, an outwardly extending end on said finger disposed between said bar and the face of said plate, said end being adapted to engage said attaching feet to limit the movement of the arm in either direction, and an indicator carried by said arm.

In testimony whereof I have hereunto set my hand in presence of two subscribing witnesses.

ANTHONY I W. PLUGGE.

Witnesses:
W. H. Van Leeuwen,
Annetta I. Van Leeuwen.